United States Patent [19]

Topnik

[11] Patent Number: 5,205,936
[45] Date of Patent: Apr. 27, 1993

[54] SEQUENCING BATCH REACTORS

[75] Inventor: Brian H. Topnik, Waterloo, Canada

[73] Assignee: Bio Clear Technology Inc., Manitoba, Canada

[21] Appl. No.: 831,537

[22] Filed: Feb. 5, 1992

[51] Int. Cl.⁵ .............................................. C02F 3/30
[52] U.S. Cl. .................... 210/614; 210/620; 210/623; 210/629; 210/630
[58] Field of Search ............... 210/605, 630, 614, 620, 210/623, 629, 621, 220, 221.2, 138, 98, 142, 143, 260, 258, 136

[56] References Cited

U.S. PATENT DOCUMENTS

| | | | |
|---|---|---|---|
| 3,522,881 | 8/1970 | Nicol | 210/134 |
| 3,524,547 | 8/1970 | Nicol | 210/134 |
| 3,679,053 | 7/1972 | Koulovatos et al. | 210/220 |
| 5,013,441 | 5/1991 | Goronszy | 210/621 |
| 5,021,161 | 6/1991 | Calltharp | 210/630 |

OTHER PUBLICATIONS

B. H. Topnik and N. W. Schmidtke, "Batch Reactor Technology Applied to Wastewater Treatment in Manitoba", Sep. 18–20, 1985.

N. W. Schmidtke and B. H. Topnik, "Application of Biological Batch Reactor Technology in Wastewater Treatment", date unknown, pp. 1–15.

Brian H. Topnik, "Operating Experiences with the Batch Aeration Process", Mar. 1983.

H. Melcer, W. K. Bedford, B. H. Topnik and N. W. Schmidtke, "Conversion of Small Municipal Wastewater Treatment Plants to Sequencing Batch Reactors", Feb. 1987, pp. 79–85.

*Primary Examiner*—Stanley S. Silverman
*Assistant Examiner*—Cynthia L. Nessler
*Attorney, Agent, or Firm*—Stevens, Davis, Miller & Mosher

[57] ABSTRACT

A sequencing batch reactor is controlled to provide an effective, efficient treatment of raw waste water. Controls include regular withdrawal of mixed liquor during each cycle of operation. The withdrawal is volumetrically controlled to provide a sludge retention time of 5 to 10 days in the system. This produces a carbon and nitrogen oxydizing bacterial culture with good setting properties. Hydraulic loads in the system are controlled according to liquid levels, while the bacterial processes are controlled by timed sequences. A storm control procedure monitors the influent rate and shortens the cycle times according to the magnitude rate, to increase the system capacity. The system also includes a novel effluent withdrawal system, with a check valve controlled intake about midway up the reactor. This is trouble-free, with the check valve preventing sludge entry into the effluent withdrawal and maintaining prime on the effluent withdrawal pump.

9 Claims, 4 Drawing Sheets

SEQUENCING BATCH REACTORS

FIELD OF THE INVENTION

The present invention relates to waste water treatment and more particularly to methods and apparatus for use in a Sequencing Batch Reactor (SBR).

BACKGROUND

The Sequencing Batch Reactor (SBR) process is a modification of the conventional activated sludge process employing a fill, treat and draw sequence.

In the SBR process, raw waste water is transferred to a reactor during a fill and react cycle. Air is introduced into the tank during this cycle to aerobically oxydize carbon and nitrogen in the form of biochemical oxygen demand (BOD) and total Kjeldahl nitrogen (TKN). When the tank fills to a predetermined high level, the raw sewage influent shuts off, air may be shut off, and the tank contents begin a react only cycle to ensure that effluent discharge requirements are obtained. Following the react cycle, the mixed liquor is allowed to settle. Clarified supernatant (effluent) occupies the upper half of the tank volume. After this settle cycle, a decant cycle begins, during which time a pump is used to draw off and discharge the treated effluent. Following effluent discharge, the apparatus enters an idle phase until the fill and react cycle begins again to repeat the entire process.

SUMMARY

The present invention is concerned with a number of improvements in a process of this general type. One of these improvements involves controlling the process to provide a predetermined average sludge retention time (SRT). This provides control over the biological processes carried out within the reactor so as to produce the desired carbon and nitrogen oxydizing bacterial culture.

According to this aspect of the present invention there is provided a method of treating waste water comprising:

a) supplying water water to be treated to a reactor;

b) injecting air into the waste water in the reactor for aerobic treatment of the waste water;

c) after step (b) allowing mixed liquor to settle in the reactor;

d) after step (c) decanting supernatant from the reactor;

e) withdrawing a predetermined quantity of mixed liquor from the bottom of the reactor; and f) repeating steps (a) to (e).

Preferably, the sludge containing mixed liquor is withdrawn during the decanting of supernatant from the reactor. It is also preferred that the quantity of mixed liquor withdrawn is selected to provide an average sludge retention time in the range of 10 to 15 days.

Another aspect of the invention provides a method of storm control procedure which monitors the influent rate and adjusts the processing of incoming waste to provide adequate treatment without overloading the system.

According to this aspect of the present invention there is provided a storm control procedure for use in a process of treating influent waste water which treatment process comprises:

a fill and react cycle comprising supplying waste water to be treated to a reactor and injecting air into the waste water;

a react cycle comprising aerobically treating the waste water in the reactor for a predetermined react time after completion of the fill and react cycle;

a settle cycle comprising maintaining quiescent conditions in the reactor for a predetermined settle time to allow sludge in the waste water to settle; and a decant cycle comprising withdrawing effluent from the reactor, the storm control procedure comprising:
monitoring the actual waste water influent rate;
comparing the actual waste water influent rate with a selected waste water influent rate; and
reducing the duration of at least one of said cycles when the actual waste water influent rate exceeds the selected waste water influent rate.

The various cycles of the treatment process may be reduced in sequence as the actual waste water influent rate sequentially exceeds a sequence of selected waste water influent rates. The storm control procedure preferably involves a first phase of reducing the decant cycle to one half by turning on a back-up decant pump. The second phase involves reducing the duration of the settle cycle to one half of its normal value. In the third phase of the storm control procedure the duration of the react cycle is reduced by one half. In the final phase, the react cycle duration is reduced to zero.

A further aspect of the present invention involves the provision of a method of controlling a waste water treatment process in which hydraulic loads are controlled according to liquid levels in the treatment apparatus and biological processes are controlled by timed sequences.

According to this aspect of the present invention there is provided a method of controlling a waste water treatment process in an apparatus comprising a reactor, waste water supply means for supplying waste water to be treated to the reactor, air injector means for injecting air into waste water in the reactor, decant means for withdrawing effluent from the reactor, and sludge discharge means for withdrawing settled sludge from the reactor, said method comprising:

monitoring the waste water level in the reactor;

initiating operation of the waste water supply means and the air injector means when the waste water level is at or below a predetermined minimum level;

stopping operation of the waste water supply means when the waste water level reaches a predetermined maximum level;

operating the air injector means for a predetermined sequence of air injection times;

allowing waste water to settle under quiescent conditions in the reactor for a predetermined settle time after expiry of the sequence of air injection times;

initiating operation of the decant means upon expiry of the settle time;

stopping operation of the decant means in response to the waste water level in the reactor reaching the predetermined minimum level; and operating the sludge discharge means for a predetermined sludge discharge time.

This aspect of the invention also provides an apparatus for treating waste water comprising:
a reactor;

waste water supply for supplying waste water to be treated to the reactor; air injector means for injecting the air into waste water in the reactor; decant means for withdrawing afluent from the reactor; sludge discharge means for withdrawing settled sludge from the reactor; and control means including:

waste water level responsive means for controlling the waste water supply means, initiating operation of the air injector means and stopping operation of the decant means;

timer means for operating the air injector means for a predetermined air injection time, for timing a predetermined settled time in response to expiry of the air injection time, for initiating operation of the decant means in response to expiry of the settled time and for operating the sludge discharge means for a predetermined sludge discharge time.

Another aspect of the present invention relates to a system for trouble free drawing off of effluent from the reactor. In the past, the drawing of effluent without taking sludge with it has proven a problem.

According to this aspect of the present invention there is provided a waste water reactor for aerobic treatment of waste water, and effluent withdrawal means comprising an inlet at a fixed position in the reactor, the inlet opening downwardly, and a check valve associated with the inlet to prevent flow of effluent out of the withdrawal means inlet into the reactor, and permitting the substantially free flow of effluent into the inlet.

BRIEF DESCRIPTION OF THE DRAWINGS

In the accompanying drawings, which illustrate an exemplary embodiment of the present invention.

DETAILED DESCRIPTION

Figure 1:
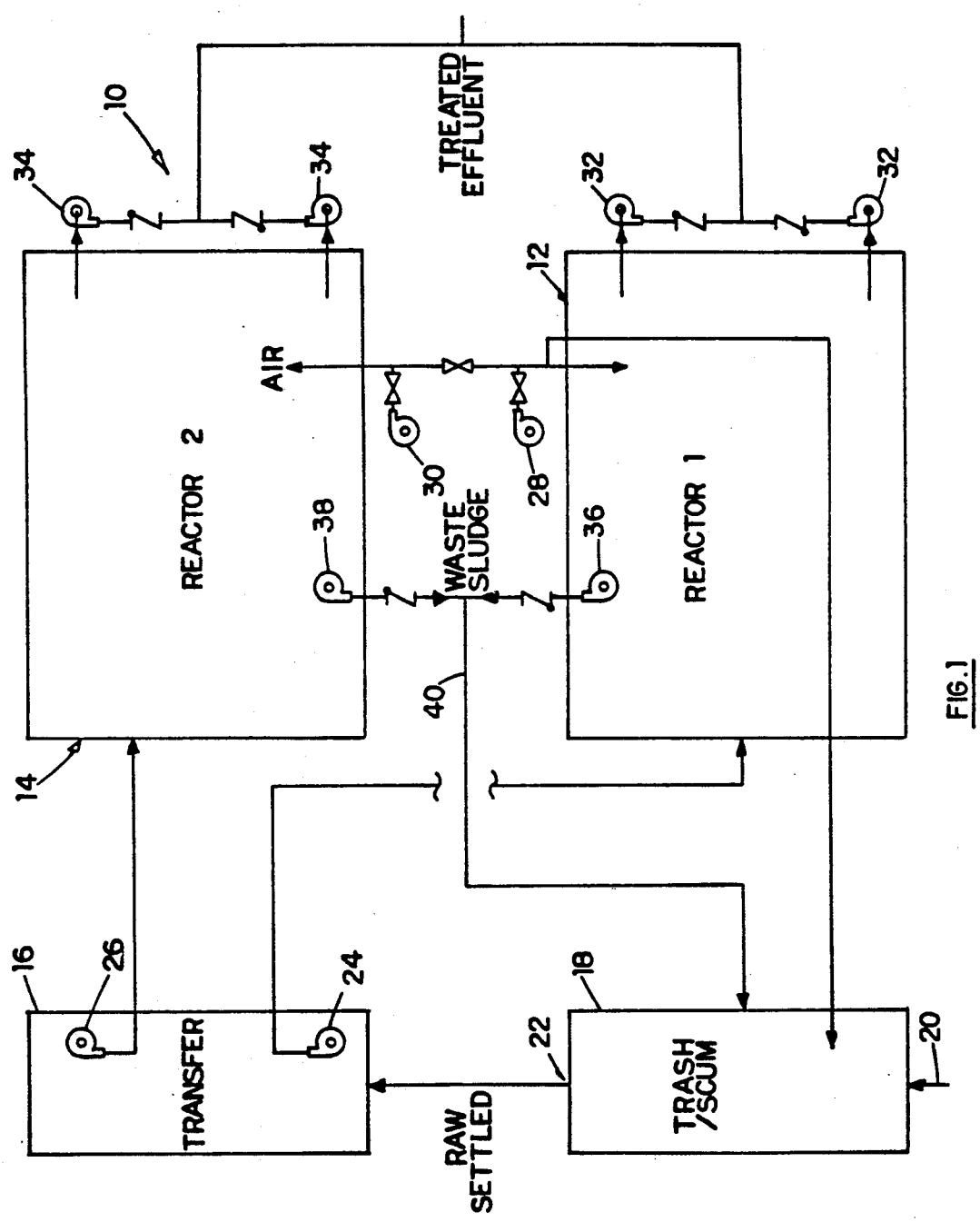
FIG. 1 is a schematic plan view of a two-reactor SBR system.

Referring to the accompanying drawings, and especially to FIG. 1, there is illustrated a sequencing batch reactor installation 10 with two reactors 12 and 14, a transfer tank 16 and a trash and scum separator 18. The trash and scum separator 18 has an inlet 20 and an outlet 22 that leads to the transfer tank 16. Raw sewage is discharged from the transfer tank to the reactors using the respective transfer pumps 24 and 26.

The reactors 12 and 14 are equipped with blowers 28 and 30 for injecting air into the reactor. The reactor 12 has two effluent pumps 32 for drawing effluent from the reactor, while the reactor 14 has two similar effluent pumps 34.

Sludge is withdrawn from the reactors 12 and 14 using sludge withdrawal pumps 36 and 38 respectively. These pump the sludge through a pipe 40 to the trash and scum separator 18 which, in this embodiment, serves as a sludge digester.

Figure 2:
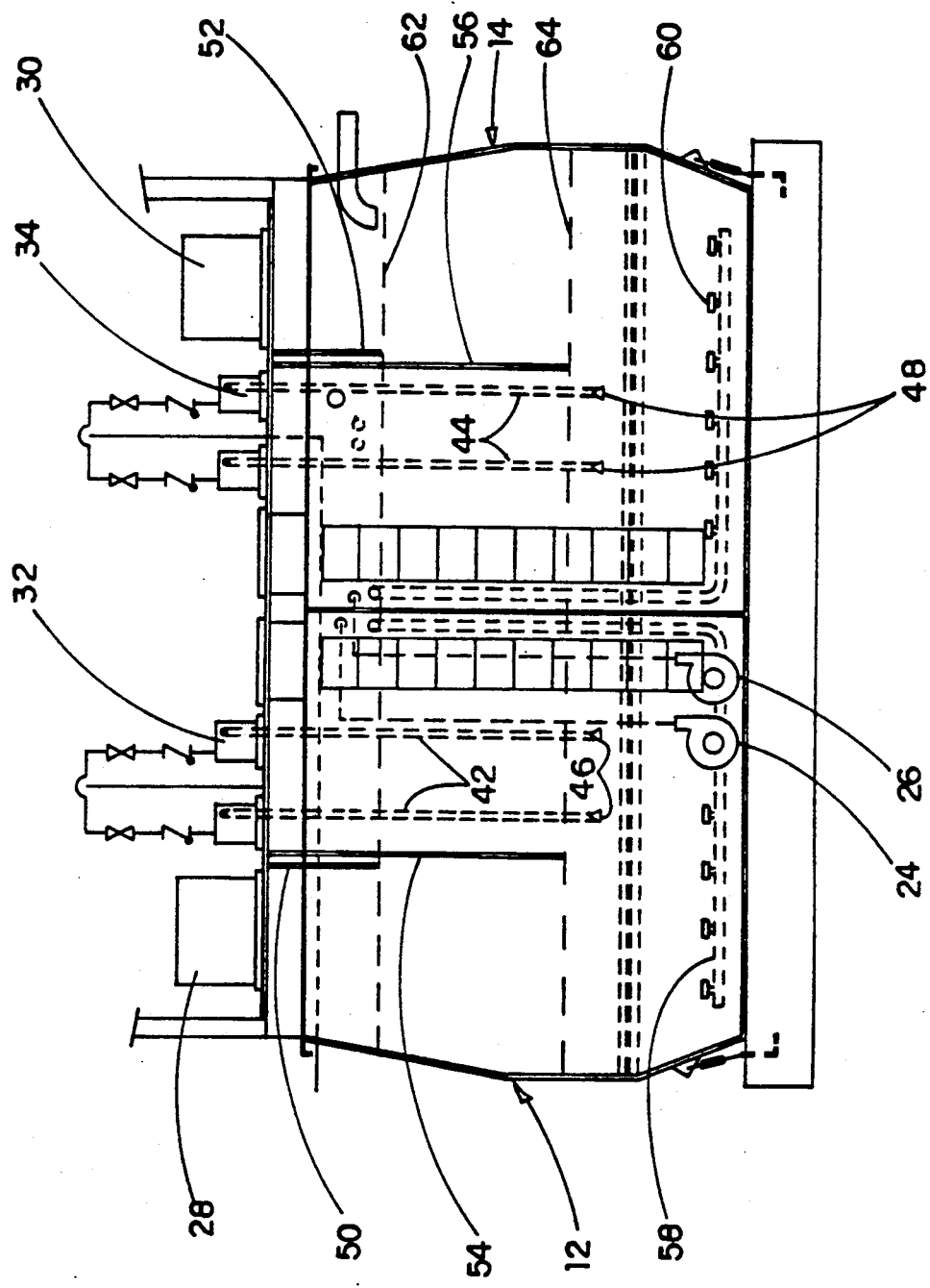
FIG. 2 is an elevation of a two-reactor tank.

A more detailed view of the reactors is shown in elevation in FIG. 2. As shown in the drawing, the reactor 12 has two effluent withdrawal lines 42 leading to the respective pumps 32 while the reactor 14 has two effluent withdrawl lines 44 for the pumps 34. The effluent withdrawl lines 42 and 44 are vertically oriented pipes extending into the reactor and equipped with gravity closed check valves 46 and 48 respectively at their lower ends.

The reactors 12 and 14 are also equipped with high level sensors 50 and 52 respectively and low level sensors 54 and 56 respectively. These sensors are positioned to detect the presence of liquid at the maximum and minimum liquid levels 62 and 64 respectively in the reactor.

FIG. 2 also illustrates the air diffusers 58 and 60 that extend across the bottom of the reactors 12 and 14 and are coupled to the blowers 20 and 30 to inject air into the reactors.

Figure 3A:
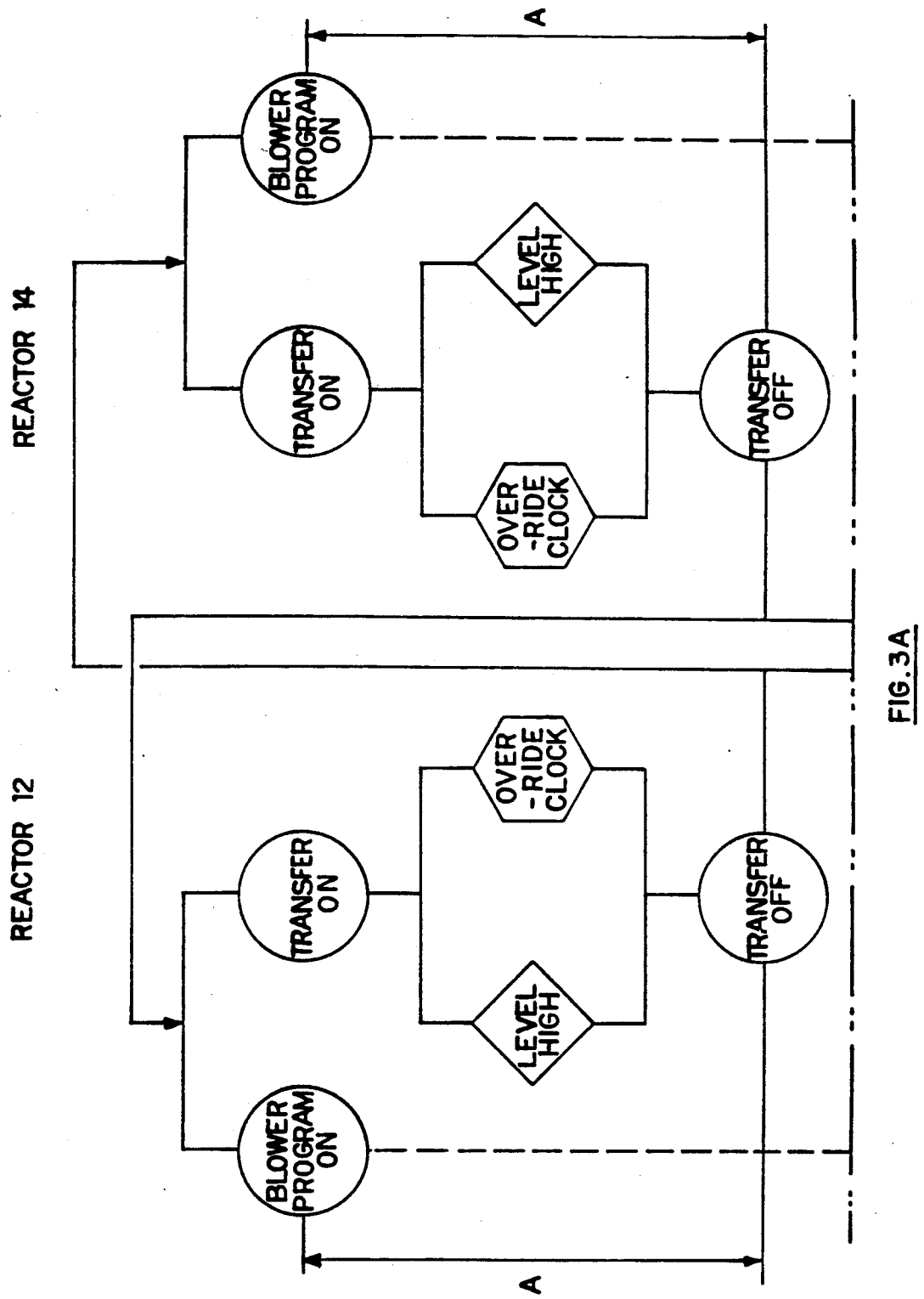
FIGS. 3A and 3B together constitute a flow chart showing the treatment process.
Figure 3B:
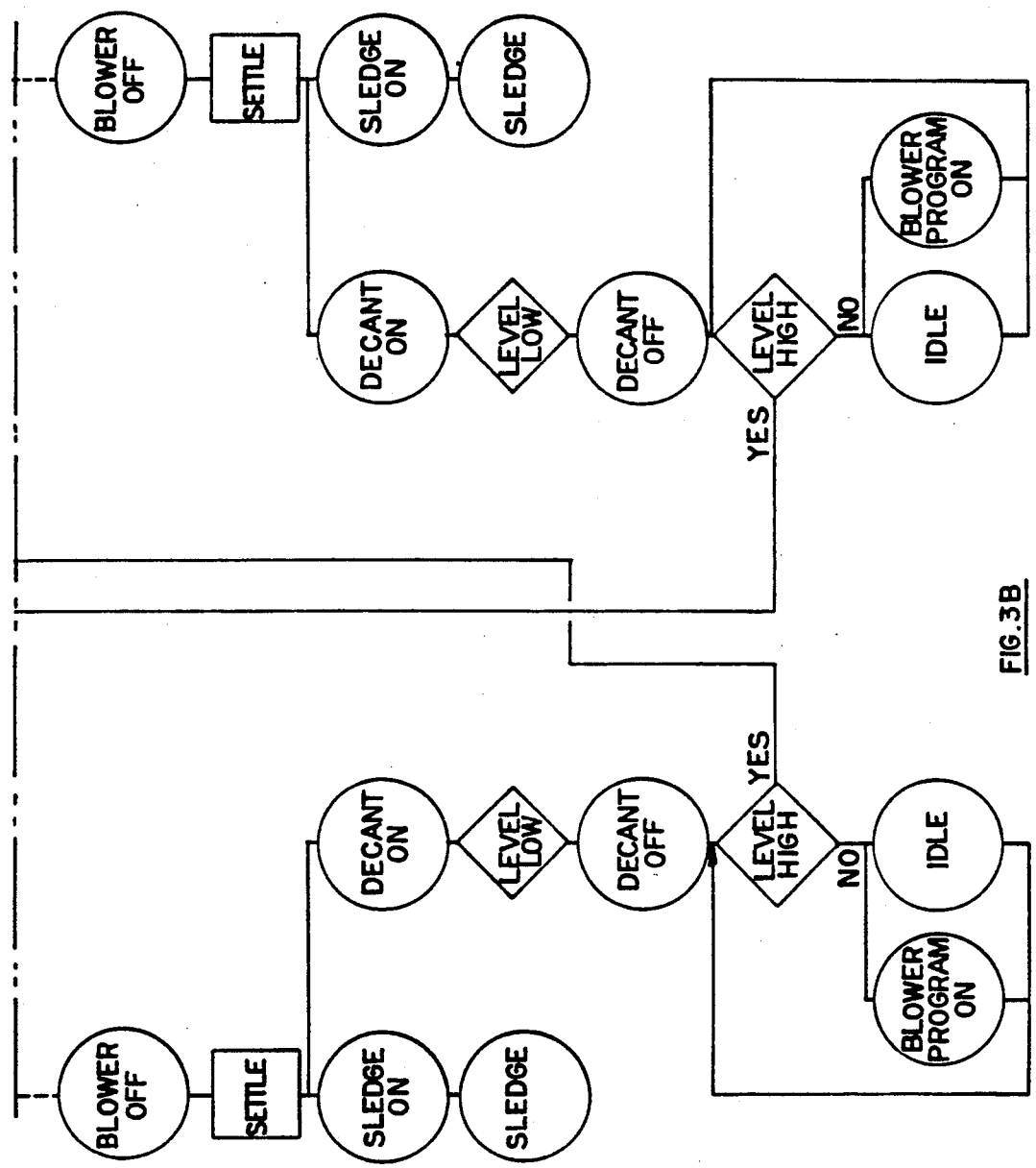

Raw sewage arriving at the reactor installation is received by the trash and scum separator, where trash is removed before the raw waste is transferred to the transfer tanks 16. When the transfer tank is full and one of the reactors 12 and 14 is empty, as detected by a level sensor 66 in the transfer tank and sensors 54 and 56 in the reactors, one of the transfer pumps 24 and 26 and one of the blower 28 and 30 are turned on to start a fill and react treatment cycle in one of the reactors. Mixed liquor microorganisms remaining from the previous cycle begin the new treatment cycle. The raw waste is aerated to oxydize the carbon (BOD) and nitrogen (TKN). The inherent flow equalization characteristic of the partially full tank minimizes the shock of erratic hydraulic and/or organic loads. The fill and react time is dependent on the incoming flow rate it may be in the order of 12 hours. The high level sensor in the reactor or a high level override clock 68 (FIG. 3) provided in the control system ultimately determines the end of the fill and react period. During this period, designated "A" in FIG. 3, the blower is turned on and off at preprogrammed intervals as determined by field operational data for the particular installation. This will save energy during lower than design flow conditions. It also maximizes the blower operation energy cost and oxygen transferring efficiency inasmuch as alternating aerobic-anoxic periods enhance floc settleability.

When the reactor has filled or the high level override clock has timed out, the flow is automatically switched to the second reactor which enters a fill and react cycle.

During the react only phase following the fill and react phase, aeration may continue to ensure that organic oxyiation is completed to the required level. If denitrification is required, an air off mix period during the react phase will reduce total nitrogen levels in the effluent. Mixers may be included in the reactor for this purpose. The on/off cycling of the blower is programmable according to the treatment conditions encountered.

Following the react only cycle, the reactor contents are allowed to settle. The settle period is necessary to separate the bacteria (mixed liquor) from the liquid supernatant. In this process the reactor vessel becomes a clarifier. The design settling period is a preset period that may be in the order of one hour. During this period solids settle to occupy approximately the bottom 30% of the reactor volume, leaving the treated, clarified effluent at the top.

Upon completion of the settle cycle, the reactor enters the decant cycle that is used to remove the treated effluent from the reactor. One of the decant pumps is turned on to draw liquid through the associated vertical check valve equipped effluent withdrawl line. The pipe intake is normally located at the middepth of the tank, approximately 2 feet above the design level of the mixed liquor interphase. The check valve ensures pump prime and precludes the entry of mixed liquor solids into the intake pipe during aeration. The decant period ends when the liquid level in the reactor reaches the low level sensor.

The waste sludge cycle conveniently takes place simultaneously with the decant cycle. The advantage of this is that the mixed liquor sludge has compacted after settling. This decreases the amount of sludge that must be handled. The sludge pump operates for a preselected time in each cycle, with the time of operation selected volumetrically to maintain the desired sludge retention time in the system.

After the reactor has been drawn down to the design low level, the reactor is once again available to accept more raw waste water so that the process sequence can be repeated. This occurs automatically if the second reactor is full. If it is not, the reactor will enter an idle phase waiting for the second reactor to fill.

During the idle period, the blower may be operated intermittently as in the fill and react period to maintain microbiological viability in preparation for the next cycle.

Although sludge may be wasted at any point in the process, it is advantageous to waste the sludge after settling and during the decant phase.

Sludge wasting controls the desired sludge retention time of 10 to 15 days. This retention time is required to provide a residence time that will produce a carbon and nitrogen oxydizing bacterial culture with good settling properties.

The sludge waste period is conveniently programmed to occur after settling so that the compaction of the mixed liquor will minimize the volume of sludge that must be pumped and ultimately handled in sludge digestion facilities.

The reactor system may be equipped with a storm cycle procedure control that accommodates excessively high hydraulic loads on the system. According to this control, the waste water influent rate to the system is monitored and if it exceeds a predetermined phase one influent rate, as recorded in the control system, the back-up decant pump is turned on to halve the decant time. A further increase of the influent rate beyond a recorded second predetermined level results in the program control reducing the duration of the settle cycle by one half. A further increase in the influent rate past a prerecorded third predetermined level causes a reduction of the react time to one half. The final phase of the storm procedure eliminates the react time entirely, so that the reactor is operating at approximately three times its design capacity. This control is acceptable since the large volume of material entering the reactor is primarily storm water and not highly contaminated, so that minimal treatment is required.

While one embodiment of the invention has been described in the foregoing, it is to be understood that other embodiments are possible within the scope of the invention. The invention is to be considered limited solely by the scope of the appended claims.

I claim:

1. A storm control procedure for use in a process of treating influent waste water which treatment process comprises:
   fill and react cycle comprising supplying waste water to be treated to a reactor and injecting air into the waste water;
   react cycle comprising aerobically treating the waste water in the reactor for a predetermined react time after completion of the fill and react cycle;
   settle cycle comprising maintaining quiescent conditions in the reactor for a predetermined settle time to allow sludge in the waste water to settle; and
   decant cycle comprising withdrawing effluent from the reactor, the storm control procedure comprising:
   monitoring the actual waste water influent rate;
   comparing the actual waste water influent rate with a selected waste water influent rate; and
   reducing the duration of at least one of said cycles when the actual waste water influent rate exceeds the selected waste water influent rate.

2. A control procedure according to claim 1 comprising sequentially reducing the duration of a plurality of the cycles of the treatment process as the actual waste water influent rate sequentially exceeds a plurality of selected waste water influent rates.

3. A control procedure according to claim 1 comprising comparing the actual waste water influent rate to the apparatus with a selected first phase influent rates and reducing the duration of the decant cycle in response to an actual waste water influent rate greater than the first phase influent rate.

4. A control process according to claim 3 further comprising comparing the actual waste water influent rate with a second selected storm phase waste water influent rate greater than the first storm phase waste water influent rate and reducing the duration of the settle cycle to less than the predetermined settle time in response to an actual influent rate greater than the second storm phase influent rate.

5. A control procedure according to claim 4, further comprising comparing the actual and third storm phase influent rate with a third selected storm phase waste water influent rate greater than the second storm phase waste water influent rate and reducing the duration of the react cycle to less than the predetermined react time in response to an actual influent rate greater than the third storm phase influent rate.

6. A control process according to claim 5 further comprising comparing the actual waste water influent rate with a fourth selected storm phase waste water influent rate greater than the third storm phase waste water influent rate reducing the react cycle duration to zero in response to an actual influent rate greater than the fourth storm phase influent rate.

7. A control process according to claim 6 wherein the duration of the decant cycle is reduced by substantially one half, the duration of the settle cycle is reduced to substantially one half of the predetermined settled time and the duration of the react cycle is reduced to substantially one half of the predetermined react time in response to an actual influent rate greater than the third storm phase influent rates and less than the fourth storm phase influent rate.

8. A control process according to claim 3 wherein the duration of the decant cycle is reduced by substantially one half.

9. A control process according to claim 4 wherein the duration of the decant cycle is reduced by substantially one half and the duration of the settle cycle is reduced to substantially one half of the predetermined settled time.

* * * * *